United States Patent [19]
Lovercheck et al.

[11] 3,973,244
[45] Aug. 3, 1976

[54] MICROCOMPUTER TERMINAL SYSTEM

[75] Inventors: Lawrence R. Lovercheck, Palo Alto; Russell K. Hileman; Richard W. Calfee, both of San Jose, all of Calif.

[73] Assignee: Zentec Corporation, Santa Clara, Calif.

[22] Filed: Feb. 27, 1975

[21] Appl. No.: 553,654

[52] U.S. Cl. ............................................. 340/172.5
[51] Int. Cl.$^2$ .......................................... G06F 3/00
[58] Field of Search .................. 340/172.5, 324 AD; 178/6.8

[56] References Cited
UNITED STATES PATENTS

| | | | |
|---|---|---|---|
| 3,345,458 | 10/1967 | Cole et al. ........................... | 178/6.8 |
| 3,364,473 | 1/1968 | Reitz et al. ........................ | 340/172.5 |
| 3,382,487 | 5/1968 | Sharon et al. ..................... | 340/172.5 |
| 3,423,749 | 1/1969 | Newcomb .................... | 340/324 AD |
| 3,593,310 | 7/1971 | Kievit ............................... | 340/172.5 |
| 3,744,033 | 7/1973 | Boyd ................................ | 340/172.5 |
| 3,750,133 | 7/1973 | Helbig et al. .................. | 340/324 AD |
| 3,778,775 | 12/1973 | Haring et al. ..................... | 340/172.5 |
| 3,786,429 | 1/1974 | Goldman et al. ................. | 340/172.5 |
| 3,803,584 | 4/1974 | Hittel ........................... | 340/324 AD |

*Primary Examiner*—Raulfe B. Zache
*Attorney, Agent, or Firm*—Jack M. Wiseman

[57] ABSTRACT

A microcomputer terminal system in which all input/output devices communicate with a microcomputer through a system bus. The microcomputer includes a microprocessor and a memory. Programs are stored in the memory of the microcomputer. The input/output devices include a keyboard and a cathode ray tube display. Through a read/write memory for the input/output devices interconnecting the keyboard and the cathode ray tube display with the system bus, the microprocessor, the keyboard and the cathode ray tube display perform their respective internal operations independently of the other.

The keyboard selectively produces signals representing character data and control data in a serial manner. The data, along with a strobe signal, are entered into a keyboard encoder circuit and from there into the read/write memory for the input/output devices and thence to the read/write segment of the microcomputer memory. The microprocessor then writes character and control information into the video refresh segment of the read/write memory for the input/output devices for display on the cathode ray tube screen. Video circuits repeatedly read this information out of the memory for the input/output devices to determine the location of the character to be displayed on the cathode ray tube screen and to enter a composite video signal on the cathode ray tube.

38 Claims, 7 Drawing Figures

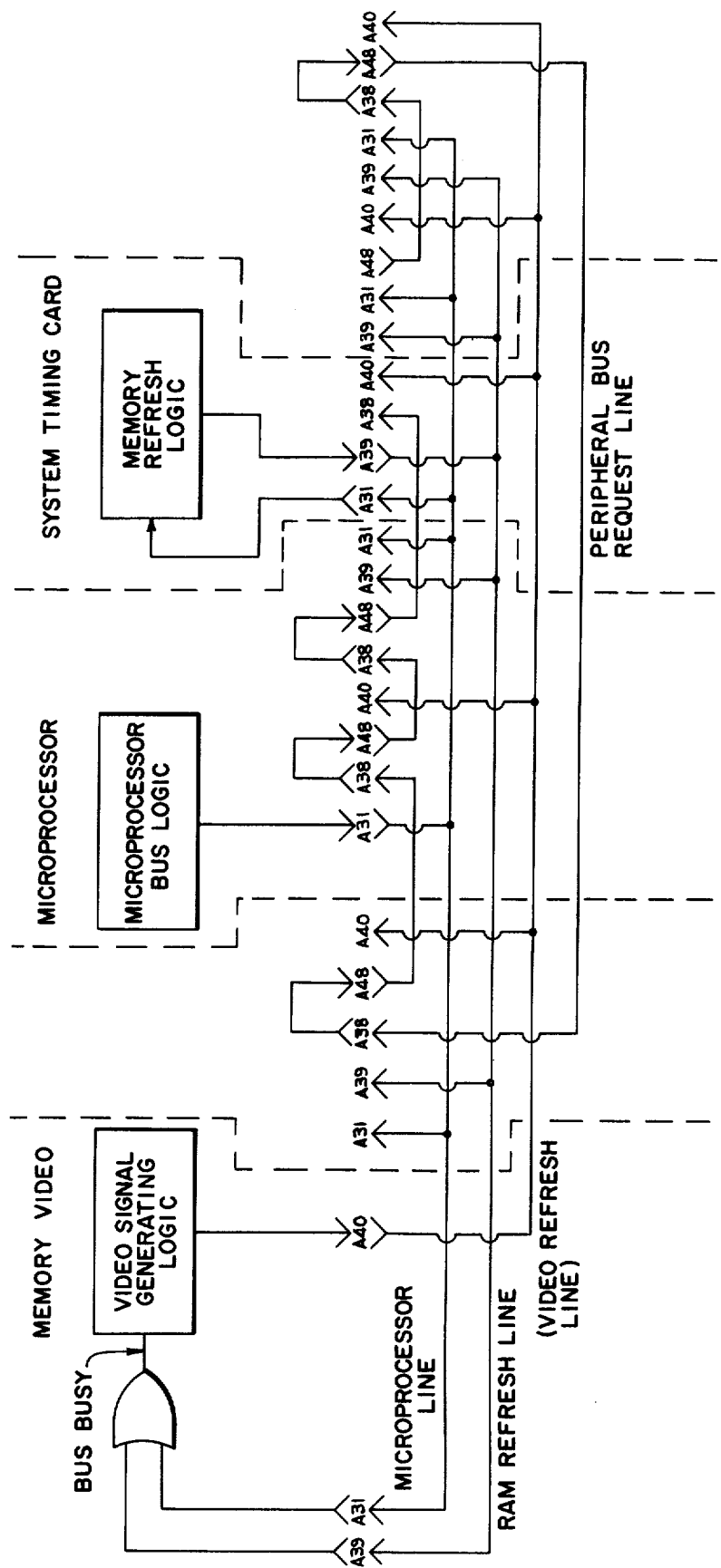

MICROCOMPUTER TERMINAL SYSTEM

BACKGROUND OF THE INVENTION

The present invention relates in general to information terminal systems, and more particularly to a microcomputer terminal system.

Heretofore, microcomputer terminal systems employed microprocessors. The microprocessor did not have its own memory, and had to either wait for the completion of the video refresh cycle or had to interrupt the video refresh cycle. When the microprocessor did not wait for the completion of the video refresh cycle, it interrupted the video display on the cathode ray tube. By failing to have its own memory, the microprocessor had to employ the system bus to read stored data. Thus, each time the microprocessor had to read stored data, it had to interrupt other operations in the system operating from the system bus. Therefore, only one operation could take place at a given time.

In the previously known devices, the cursor was controlled by the microprocessor and the keyboard for placement in the memory for the input/output devices. The microprocessor did not have exclusive control over the placement of the cursor in the memory for the input/output devices. Thus, the microprocessor did not know the location of the cursor at all times. This resulted in more complicated programming procedures.

When the keyboard wrote the cursor location along with the microprocessor, it required microprocessor intervention to get characters from the keyboard to the memory for the input/output devices. Accordingly, the keyboard, in the previously known devices, did not have direct access to the memory for the input/output devices. Consequently, the versatility of the microcomputer system was unduly limited. A patent of interest for digital storage and generation of video signals is the patent to Cole et al., U.S. Pat. No. 3,345,458.

SUMMARY OF THE INVENTION

An information terminal system in which the video circuits have a first set of shift registers receiving character data from a memory for the input/output devices and a second set of shift registers receiving character data from the first set of shift registers and advancing character data to a character generator for displaying data on the screen of a cathode ray tube. When the second set of shift registers advances character data to the cathode ray tube, the first set of shift registers receives the character data to be displayed in the succeeding row on the cathode ray tube screen.

In this manner, the first set of shift registers can delay loading of the character data from the memory to the first set of shift registers to give priority to a microprocessor. Thus, the microprocessor can operate at its own rate and obtain priority over the use of the system bus without interrupting the screen refresh cycle or the cathode ray tube display.

A feature of the present invention is that the microprocessor has its own memory. Thus, it can store data and read data from its memory without using the system bus. Accordingly, more than one operation can take place at a given time.

Another feature of the present invention is that the microprocessor has exclusive control over the cursor location and the placement of the cursor in the memory for the input/output devices. In this manner, the microprocessor knows the location of the cursor at all times to simplify programming procedures.

Still another feature of the present invention is that the keyboard has direct access to the memory for the input/output devices. Hence, character data from the keyboard can enter the memory for the input/output devices without intervention by the microprocessor or the presence of the microprocessor.

The microprocessor periodically reads the memory for the input/output devices to find the character data in the memory for the input/output devices and will write the character data in the memory for the input/output devices at the cursor location, which cursor location is at the exclusive control of the microprocessor.

From the foregoing, it is observed that the operational characteristics of the microcomputer terminal system is dependent on the programming for the microprocessor, thereby improving the versatility of the microcomputer terminal system.

DESCRIPTION OF THE DRAWINGS

FIG. 7 is a diagrammatic illustration of bus request logic circuits.

DESCRIPTION OF THE PREFERRED EMBODIMENT

Figure 1:
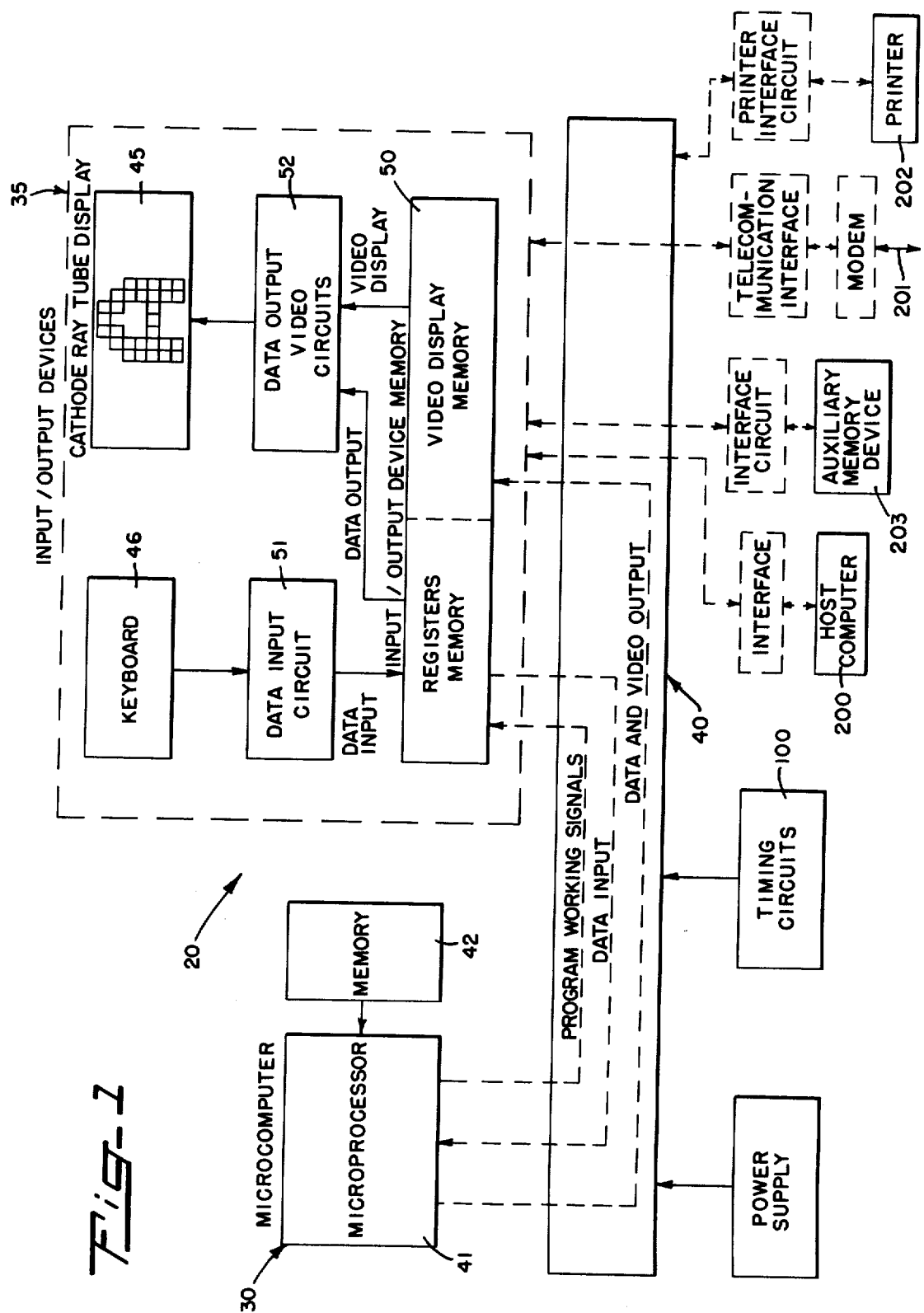
FIG. 1 is a block diagram of a microcomputer terminal system embodying the present invention.

Illustrated in FIG. 1 is a microcomputer terminal system 20 embodying the present invention, which includes a microcomputer 30, input/output devices 35 and a system bus 40. The microcomputer 30 comprises a microprocessor 41 and a memory 42, which memory 42 includes a read only segment. The microprocessor 41 is of the type manufactured by Intel Corporation of Santa Clara, California, such as an Intel 8008. A program is stored in the read only memory 42 and video display information is stored in the read/write segment of a memory 50. The video display information stored in the read/write segment of the memory 50 is repeatedly read out of the memory to refresh the video data signals applied to a conventional cathode ray tube display 45 of the input/output devices 35. The cathode ray tube display may be of the type manufactured by the Miratel Division of Ball Brothers Research Corporation as Model 1M1009.

In addition to the cathode ray tube display 45, the input/output devices 35 include a conventional keyboard 46. The read/wirte memory 50 for the input/output devices 35 is connected to the system bus 40 and to a data input circuit 51 for the keyboard 46 and to a data output video circuit 52 for the cathode ray tube 45.

All the memories are conventional and well-known. The read/write memory (RAM) 50 is a 2048X1 bit type with eight integrated circuits connected in parallel for reading and writing 8-bit words and is of the type manufactured by Advanced Memory Systems, Inc. of Santa Clara, California, as the AMS6003.

The input/output devices 35 communicate with the microprocessor 41 through the system bus 40. Additionally, all data between the input/output devices 35 and the microprocessor 41 are communicated through the read/write memory 50. The read/write memory 50 can be read and written into either by the microprocessor 41 or by the input/output devices 35.

In the exemplary embodiment, the keyboard produces 8-bit bytes of standard ASCII coded alphanumeric or control data to an operator depressing a key on the keyboard 46. This data, along with a strobe signal, is entered into the data input circuit 51, which, in turn, advances the data into the register segment of the read/write memory 50 for storage. The data output from the register segment of the memory 50 is 8-bit bytes as is the data from the video display segment of the memory 50 to the data output video circuit 52. The microprocessor 41 reads the data from the register segment of the memory 50 and writes the data into the video display segment of the memory 50 to be read by video circuits 52 for the cathode ray tube 45. Thus, the input/output devices 35 communicate with the microcomputer 30 in 8-bit byte format to either supply or receive data and instructions from the microcomputer 30. The keyboard 46 produces data and instructions for the microprocessor 41 and the cathode ray tube display 45 receives data and instructions from the microprocessor 41.

The data and strobe signal stored in the register segment of the memory 50 are available to the microprocessor 41 for processing. As the microprocessor 41 completes a data processing sequence, it writes an ASCII coded alphanumeric character and control information back into the video refresh segment of the memory 50 for display on the cathode ray tube screen 45 through the data output video circuits 52. In turn, the data output video circuits 52 repeatedly read this information out of the video refresh segment of the memory 50, convert the ASCII coded characters into a video signal, use the control information to determine the location at which the character is to be displayed on the cathode ray tube screen 45 and enter a composite video signal to the cathode ray tube display 45.

From the foregoing, it is to be observed that the microprocessor 41 can read the character data stored in the read only segment of the memory 42 without going through the system bus 40. Thus, the bus 40 can be employed by an input/output device during this event to read or write from the read/write memory 50.

Figure 2:
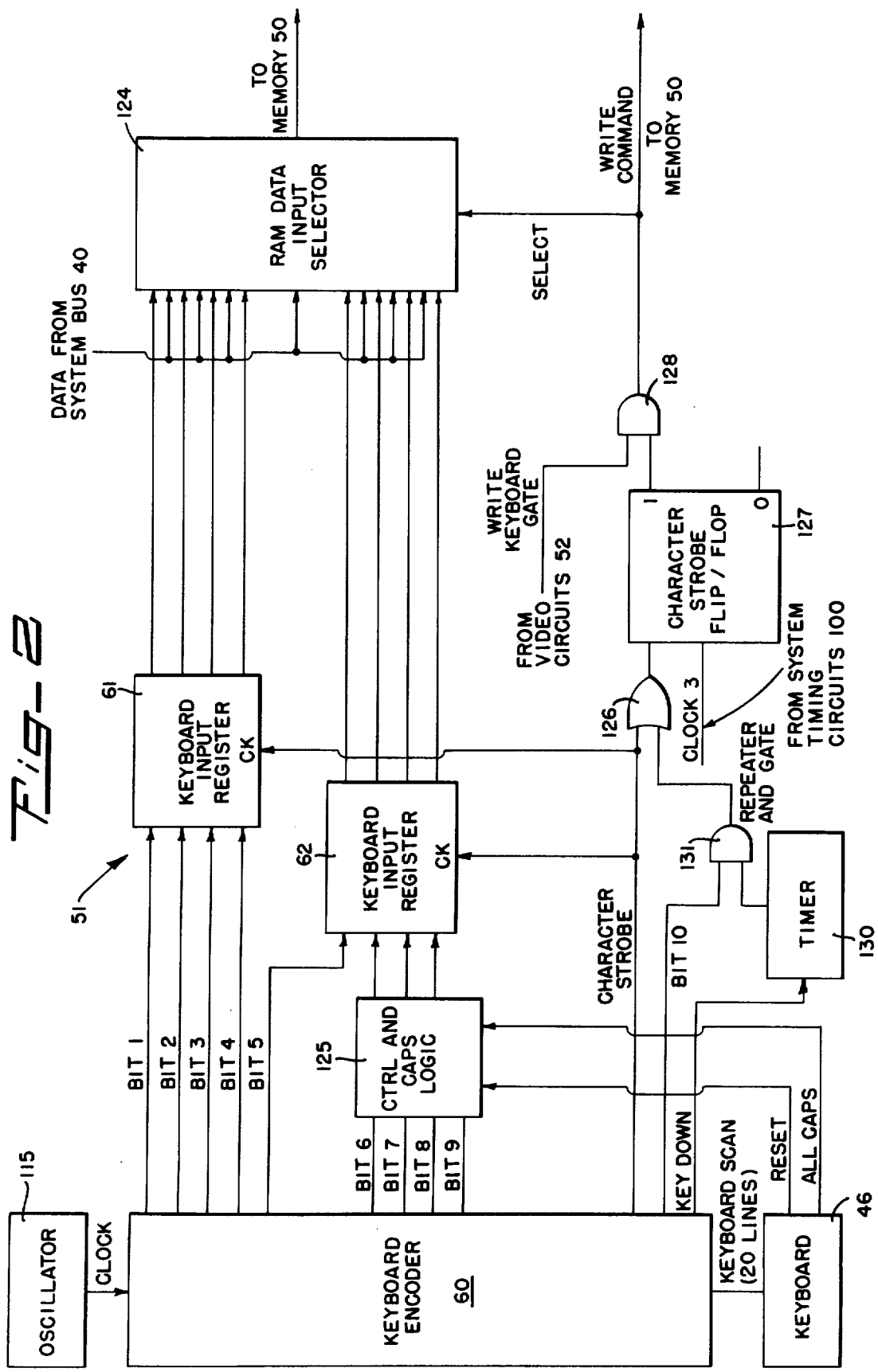
FIG. 2 is a block diagram of a keyboard and data input circuits employed in the microcomputer system shown in FIG. 1.

To gain access to any memory location, a 14-bit address is employed. The address is determined in part by each memory and in part by decoding circuitry. When a key on the keyboard 46 is depressed, it causes a conventional keyboard encoder circuit 60 of the data input circuit 51 (FIG. 2) to produce an 8-bit code in ASCII format. This 8-bit code is buffer stored in keyboard input registers 61 and 62 of the data input circuit 51 for entry to the working register segment of the read/write memory 50. The character data stored in the register segment of the memory 50 is periodically monitored by the microprocessor 41 and the processing by the microprocessor commences.

When the keyboard entry is a data character, the character is displayed on the cathode ray tube screen 45. Toward this end, the microprocessor 41 enters the character data read from the register segment of the memory 50 into the video display segment of the memory 50 at a location corresponding to the location of a cursor appearing on the cathode ray tube screen 45 simultaneously therewith. The microprocessor 41 enters the cursor signal into the video display segment of the memory 50 to be read by the video circuits 52 for locating the cursor on the screen of the cathode ray tube display 45. The location of the cursor in the video display segment of the memory along with the other information in the video display segment of the memory 50 is read by the data output video circuit 52, translated into a video signal and displayed as a dot pattern on the screen of the cathode ray tube 45.

A keyboard entry may also be one of 32 control characters. A control character may involve the relocation of the cursor and moving or erasure of a display segment in the screen of the cathode ray tube display 45. If the control character is a command to erase the entire screen of the cathode ray tube display 45, the microprocessor loads blank characters in all locations of the video display segment of the memory 50 and also changes the cursor location address in the register segment of the memory 50 to the value for home position. Then, during the next video refresh cycle, the data output video circuits pick up this revised information, display a blank screen on the cathode ray tube display 45 and place the cursor at home position.

In the register segment of the read/write memory 50, all the working registers thereof are 8-bit wide. Certain of the registers hold information used actively by the microprocessor 41 during data processing. Additional registers communicate with the input/output devices 35 and also may communicate with the microprocessor 41. There are cursor address registers in the memory 50 to identify the locations of the cursor on the cathode ray tube display 45. One register identifies the cursor row and another register identifies the cursor column. The cursor address registers are loaded by the microprocessor 41 and are read by the data output video circuits 52. Additionally, there are keyboard input character registers which receive character data from the keyboard 46 through the data input circuits 51. The keyboard registers of the memory 50 are read by the microprocessor 41. The keyboard registers of the memory 50 contain eight significant bits. The standard ASCII alpha-numeric characters, punctuation marks and symbols are defined by the first seven bits, and the eighth bit is used to identify signals from the numeric upper case codes of selected control characters and codes generated by selected keys while the CTRL (control) key is held depressed.

The video display segment of the memory 50 stores one byte for every character position on the cathode ray tube screen 45. When a displayable character is entered by the keyboard 46, the microprocessor 41 processes that character and writes it into the video display segment of the memory 50. From there, the stored character data in the video display segment of the memory 50 is read out periodically by the data output video circuits 52, changed into video signals and displayed on the screen of the cathode ray tube display 45. Thus, the microprocessor 41 writes into the video display segment of the read/write memory 50 as needed to alter the display image and the data output video circuits continously read out the character data stored in the video display segment of the memory 50.

In the exemplary embodiment, the video display segment of the memory 50 stores 1920 bytes of data representing the 80 characters on each of the 24 display lines for the cathode ray tube screen 45. An additional 80 bytes are stored in the video display segment of the memory 50 for the 25th line on the cathode ray tube screen 45 to identify the current operating mode. Any byte stored in the video display segment of the memory 50 is interpreted by the data output video circuits 52 either as a data character or a control code. If a byte is interpreted as a data character, the character is displayed on the screen of the cathode ray tube 45. If a byte is interpreted as a control code, it specifies to the data output video circuits 52 the display effect which applies to all succeeding data characters. Whether a given byte is a control code is determined by its three most significant bits.

Figure 3:
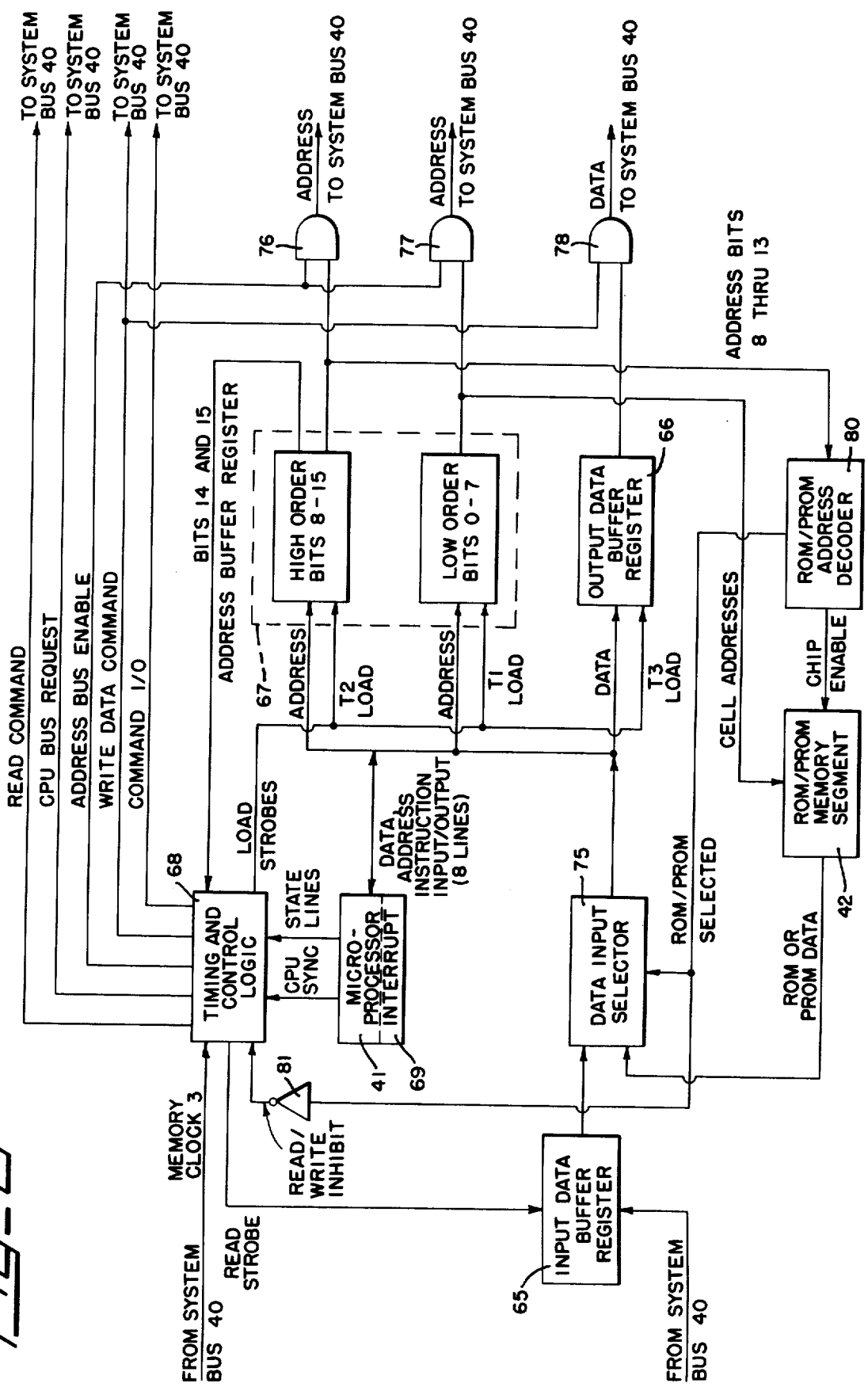
FIG. 3 is a block diagram of a microprocessor and associated circuits employed in the microcomputer terminal system shown in FIG. 1 illustrated with a read only segment of a microcomputer memory.

Illustrated in FIG. 3 is the microprocessor 41, its associated circuits and the read only segment of the memory 42. The microprocessor 41 performs all program controlled data processing functions. For example, it can read or write data into the read/write memories, communicate with input/output devices, and establish initial operating conditions. The input data buffer register 65 receives input data from the memory 50 over the system bus 40 for entry into the microprocessor 41. The entry into the microprocessor 41 is made through a data input selector 75. The input data over the system bus 40 is generated from the keyboard 46 and enters the system bus 40 through the register memory segment of the memory 50 by way of the data input circuit 51. The microprocessor 41 sends data over the bus 40. Toward this end, output data buffer register 66 receives output data from the microprocessor 41 for entry to the system bus 40 through an AND gate 78. Address buffer register 67 communicates addresses between the microprocessor 41 and the system bus 40 through AND gates 76 and 77. A timing and control logic circuit 68 synchronizes the data, address and instruction input/output operations with the internal state of the operating cycle of the microprocessor 41 and with the various output commands to the system bus 40.

During the write operation and at the state $T_1$ of the microprocessor cycle, the microprocessor 41 enters the lower order 8 address bits into the address buffer register 67. Simultaneously, the timing and control logic circuit 68 enters the load strobe into the address buffer register 67. During the state $T_2$ of the microprocessor cycle, the higher order six address bits and two control bits, which define the write operation, are loaded into the address buffer register 67 by the microprocessor 41. The higher order bits are clocked into the address buffer register 67 by the timing and control logic circuit 68 by the load strobes. During the state $T_3$ of the microprocessor cycle, eights bits of character data enter the output data buffer 66 from the microprocessor 41, which are clocked into the output data buffer register 66 by the load strobes from the timing and control logic circuit 68. Thus, 14 address bits and 8 character data are available at the buffer registers 66 and 67 through the AND gates 76–78 upon the completion of the state $T_3$.

In order to gate the address and data through the AND gates 76–78 to the system bus, 40, the timing and control logic circuit 68 supplies enabling signals to the gates 76–78. When the higher order address bits are in the address buffer register 67, bits 14 and 15 are decoded in the timing and control logic circuit 68 to set a flip-flop therein, not shown, that defines the write operation. The setting of the write flip-flop is synchronized with the trailing edge of the system memory clock 3 from the bus 40. The trailing edge defines the end of one memory cycle and the beginning of the next memory cycle. The output of the write flip-flop is used to generate a microprocessor bus request signal, an address bus enable signal, and a write data command. These signals are used to gate addresses and data from the registers 66 and 67 through the gates 76–78 over the system bus 40 to complete the write operation.

When the microprocessor 41 is performing a read operation, it selects either data from the memory 50 through the system bus 40 or data from the read only sgement of the memory 42, in which case data is read directly from the memory 42 without the use of the system bus 40. Thus, the input/output devices 35 may use the system bus 40 to perform another operation while the microprocessor 41 reads the read only segment of the memory 42.

During the states $T_1$ and $T_2$ of the microprocessor cycle, the read operation is similar to the write operation. At the state $T_1$ of the microprocessor cycle, the microprocessor 41 enters the lower order 8 address bits into the address buffer register 67. Simultaneously, the timing and control logic circuit 68 enters the load strobe into the address buffer register 67. During the state $T_2$ of the microprocessor cycle, the higher order six address bits and two control bits, which define the read operation, are loaded into the address buffer register 67 by the microprocessor 41. The higher order bits are clocked into the address buffer register 67 by the timing and control circuit 68 by the load strobes.

After the state $T_2$ of the microprocessor cycle, when the higher order address bits are in the address buffer register 67, the bits 14 and 15 are decoded in the timing and control logic circuit 68 to set a read flip-flop, not shown, which defines the read operation. The setting of the read flip-flop is synchronized with the trailing edge of the system memory clock 3 and the state $T_2$ of the cycle of the microprocessor 41. At the time the bits 14 and 15 are decoded, adress bits 8 through 13 are supplied to a read only memory address decoder 80 by the address buffer register 67. If the bits 14 and 15 are decoded by the address decoder 80 into a read only memory address, a read only memory selected signal is generated for entry into the data input selector 75. The read only memory selected signal causes the data input selector 75 to switch to the read only memory data line and causes an output gate (not shown) from the output of the read flip-flop, not shown, to be turned off. As a consequence thereof, the read operation command signals, such as the microprocessor bus request, adress bus enable, or read command are inhibited by the selected signal produced by the address decoder 80 and applied to the timing and control logic circuit 68 through an inverter circuit 81. Thereupon, the program data from the read only memory segment of the memory 42 is read by the microprocessor 41 through the data input selector 75.

If the bits 8 through 13 are not decoded by the address decoder 80, read operation command signals are generated by the timing and control logic circuit 68 and the address buffer register 67 output signals are gated through the gate 76 and 77 to the system bus 40 along with a read command and microprocessor bus request from the timing and control logic circuit 68. In addition thereto, a read strobe is generated by the timing and control logic circuit 68 and used to load data from the read/write memory 50 into the input data buffer register 65 over the system bus 40. In the absence of the read only memory selected signal from the address decoder 80, the data input selector 75 enables data on the system bus 40 to pass through the input data buffer register 65, through the data input selector 75 and into the microprocessor 41 over its input/output lines to complete the read operation.

Figure 4:
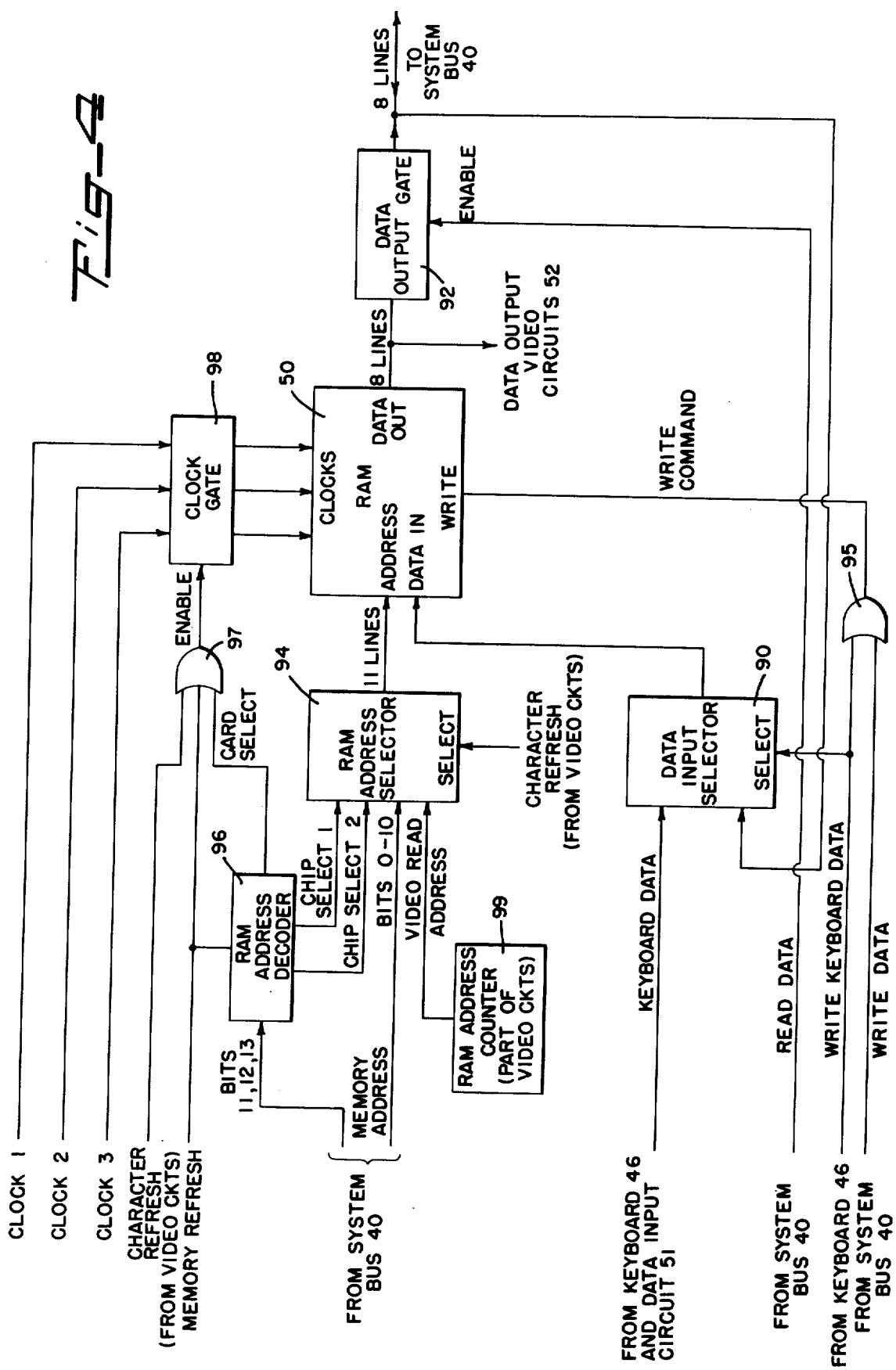
FIG. 4 is a block diagram of the read/write memory control circuits for the input/output devices employed in the microcomputer system shown in FIG. 1.

Illustrated in FIG. 4 are the read and write control circuits for the read/write memory 50. Data can either be written into the memory 50, read out of the memory or the cells of the memory 50 can be refreshed. Data can enter into the memory 50 either from the system bus 40 through a data input selector 90 or from the keyboard 46 through the data input circuit 51 and through the data input selector 90. Data can be read out of the memory 50 either through the system bus 40 and a data output gate 92 or directly to the data output video circuits 52. During a refresh cycle, there is no alteration of the data of the read/write memory 50.

To regulate the alterations between read, write and refresh cycles, as well as to route data to and from the read/write memory 50, data switching and control circuits are employed. During a write data cycle, three memory clock pulses, clock 1, clock 2 and clock 3, an address, and a write command are supplied to the memory 50. The clock pulses, clock 1, clock 2 and clock 3, are supplied to the memory 50 through a clock gate 98. The address is supplied over the system bus 40 through an address selector 94. A write command is supplied either from the system bus 40 through an OR gate 95 or from the keyboard 46 and the data input circuit through the OR gate 95. If the data comes from the system bus 40, then the address comes from the system bus 40. The data input selector 90 and the write/read memory address selector 94 are used to route the data and the address to the memory. The data is entered through the selector 90 and the address is entered through the selector 94.

If the data over the system bus 40 is to be entered into the memory 50, the upper three bits (11, 12 and 13) of the address line from the microprocessor 41 enter through the system bus 40 and are decoded by an address decoder 96 to generate a select signal. The select signal advances through an OR gate 97 and enables a gate 98 to gate the three clock pulses through the gate 98 to be applied to the memory 50. The write command is routed from the microprocessor 41 through the system bus 40 and through the OR gate 95 to be applied to the memory 50.

When the keyboard data enters the memory 50, the data input selector 90 and the address selector 94 are switched to sense their alternate input signals and the character refresh signal is used to control the gating of the clock pulses. The writing of the keyboard data is performed during video refresh cycles. The write command is applied to the memory 50 from the keyboard 46 through the data input circuit 51 (FIG. 2) and through the OR gate 95. The input data is produced by the keyboard 46 and enters the memory 50 by way of the data input circuit 51 and the data input selector 90. The address enters the memory 50 for bits 0 through 10 from the system bus 40 and through the address selector 94. The character refresh signal passes through the OR gate 97 to enable the clock gate 98 to gate the three clock pulses for application to the memory 50 through the clock gate 98.

During a read cycle, the data output from the memory 50 can either enter the system bus 40 through the data output gate 92 or can go directly to the data output video circuits 52. If the data is to go directly onto the system bus 40, a read address is supplied from the microprocessor 41 through the system bus 40. The data is then decoded and routed in the manner described for the write cycle. More specifically, the upper three bits (11, 12 and 13) of the address line from the mircroprocessor 41 enter through the system bus 40 and are decoded by the address decoder 96 to generate a select signal. The select signal advances through the OR gate 97 and enables the clock gate 98. The select signal from the address decoder 96 is used to gate the clock pulses through the clock gate 98 to be applied to the memory 50. The read data command from the system bus 40 is used to enable the data output gate 92 for placing the data output from the memory 50 onto the system bus 40.

When the data to be read is for the data output video circuits 52, the character refresh signal from the video circuits is used to route the output from a read/write memory address counter 99 to the read/write memory 50 by way of the address selector 94. The character refresh signal also gates the clock pulses through the OR gate 97 and the clock gate circuit 98. The output of the memory 50 is now loaded directly into one of the video circuit registers of the data output video circuit 52.

During a refresh cycle, all data input and output circuits are inactive. The clocks 1, 2 and 3 signal and the lower six bits of the address are required. The memory refresh signal is used by way of the OR gate 97 to gate clocks 1, 2 and 3 through the clock gate 98. Additionally, the memory refresh signal is used to route the address bits through the address decoder 96 and the address selector 94 to be applied to the memory 50.

Figure 5:
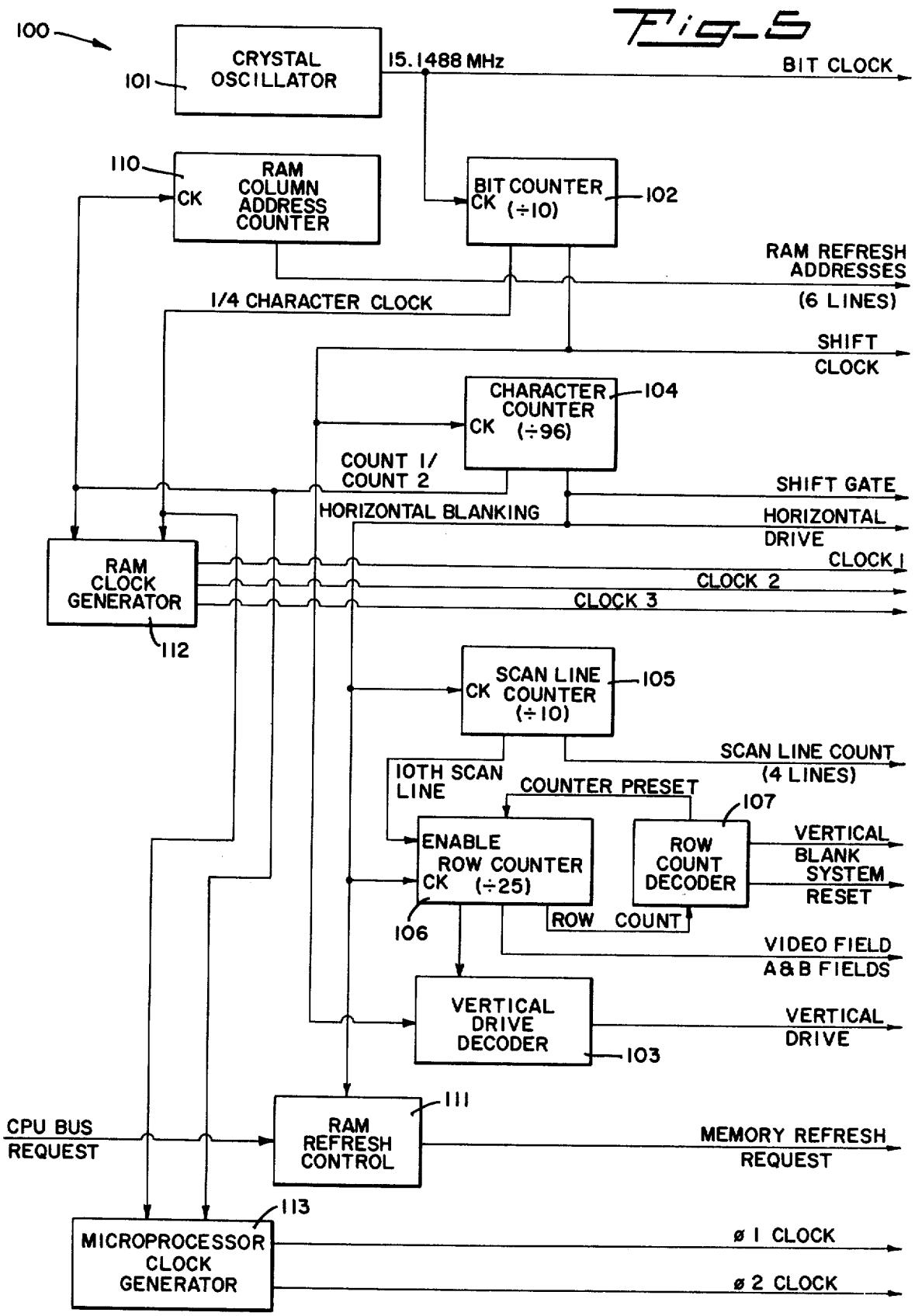
FIG. 5 is a block diagram of timing circuits employed in the microcomputer system shown in FIG. 1.

Illustrated in FIG. 5 are the timing circuits 100 for the microcomputer terminal system 20. The timing circuits 100 provide the source for the various clock frequencies used in the microcomputer terminal system 20 and also the timing circuits 100 control the refreshing of the dynamic memories stored in the memory 50. The timing circuits 100 additionally relate to the generation of refresh signals and the use of the refresh signals during refresh cycles.

The timing circuit 100 ccomprises a crystal oscillator 101. In the exemplary embodiment, the oscillator 101 produces clock pulses at the nominal rate of 15.1488 $MH_z$. The clock pulses at the nominal rate of 15.1488 $MH_z$ go over the system bus 40 for the system bit clock pulses, which determines the time duration or width of a picture element in the data characters displayed on the screen of the cathode ray tube 45. The output of the crystal oscillator is also received by a divide by ten bit counter circuit 102. The output signal of the bit counter 102 goes over the system bus 40 as shift clock pulses or character clock pulses and determines the width of the characters displayed on the screen of the cathode ray tube 45. Additionally, the output of the bit counter 102 is applied to a vertical drive decoder 103.

The output of the bit counter 102 is also received by a divide by 96 character counter 104. The output of the character counter 104 goes over the system bus 40 as shift gate pulses and as clock pulses to control the horizontal drive and horizontal blanking of the cathode ray tube display 45.

For vertical blanking and vertical drive to be applied to the cathode ray tube display 45, the output of the character counter 104 is received by a divide by 10 scan line counter 105. The output of the scan line counter 105 goes over the system bus 40 to be applied to the cathode ray tube display 45 to count scan lines, such as four scan lines. On the tenth scan line, the scan line counter applies an enable signal to a divide by 25 row counter 106. The output clock signal of the character counter 104 is also applied to the row counter 106. When the row counter 106 is enabled, the clock pulse output therefrom is received by a row counter decoder 107. The row counter decoder 107 presets the counter of the row counter 106, sends a vertical blanking signal of the system bus 40 for the cathode ray tube display 45, and sends a system reset signal over the system bus 40. Additionally, the row counter 106 sends a video field signal over the system bus 40 for the cathode ray tube display 45. The field signal determines, during any given field, when the keyboard character code is written into the memory 50.

The row counter 106 also enables the vertical drive decoder 103. When the vertical drive decoder 103 is enabled, the clock pulse signal output derived from the bit counter 102 and in the output of the vertical drive decoder 103 is applied to the cathode ray tube display 45 over the system bus 40.

To generate the memory refresh addresses, a two-stage, six bit counter or a column address counter 110 is employed. The input side of the column address counter 110 is connected to the output of the character counter 104. The ouput of the column address counter 110 continuously generates the same refresh addresses, such as the lower six address bits of the memory addresses, for entry onto the system bus 40. The lower six addresses define one of 64 cell columns within a given register in the read/write memory 50. The six bits are gated out with memory refresh request onto the address bus of the system bus 40 and routed to all the registers of the read/write memory 50.

The memory refresh request signal is generated by the output of the character counter 104 through a read/write memory refresh control circuit 111 that is operated by the microprocessor bus request. The memory refresh signal is also used to enable all read/write memory registers and supply the necessary clock signals so that the same cell columns of the memory 50 are refreshed simultaneously.

The output of the character counter 104 and the output of the bit counter 102 are applied to a read/write memory clock generator 112 to send over the system bus 40 the phase 1 clock pulses and the phase 2 clock pulses. The output pulses from the bit counter 102 and the output pulses from the character counter 104 are applied to a microprocessor clock generator 113 for generating the clock 1 pulses, the clock 2 pulses and the clock 3 pulses for the system bus 40 and for gating through the clock gate 98 (FIG. 4).

The keyboard encoder circuit 60 of the data input circuit 51 (FIG. 2) generates an 8-bit character code when a key on the keyboard 46 is depressed. The output of the key encoder circuit 60 is ready to supply a code for writing into the keyboard input character registers 61 and 62. The bits 1–4 are received by the keyboard input register 61 and bits 5–8 are supplied to the keyboard input register 62. Whenever a key is depressed, the closed key switch contacts are sensed by the keyboard encoder 60. The keyboard encoder 60 continuously scans all key switch locations and when it senses a closed contact, it responds by producing a 10-bit code representative of the depressed key. The scanning rate for the keyboard encoder 60 is determined by an oscillator 115 of the data input circuit 51, and the code output of the keyboard encoder 60 is synchronous with a signal pulse character strobe, which character strobe pulse is also derived from the output of the oscillator 115. In addition to the 10-bit code and the character strobe pulse, the keyboard encoder circuit 60 also produces a key down logic level signal. The reset key on the keyboard 46 does not generate a code, but simply provides a grounded return switch signal on the reset signal line.

The 10-bit code output from the keyboard encoder 60 consists of an 8-bit word supplied to the read/write memory 50 from the keyboard output registers 61 and 62 through a data input selector 124, and two control bits used by the keyboard 46 and its associated circuitry. The 8-bit word includes a 7-bit ASCII code and the eighth bit is used to identify input signals from the numeric pad, five upper case codes of selected control characters and 26 codes generated by the selected keys while the CTRL (control) key is depressed. The ninth bit is a logic 0 for the ALL CAPS (upper case) key on the keyboard 46. The tenth bit is inserted with all codes that represent a repeatable key.

Bits 6, 7 and 8 are routed through a control and capital logic circuit 125 to the keyboard input register circuit 62 for entering into the read/write memory circuit 50 through the data input selector 124. The bits 6, 7 and 8 are modified through the CTRL (control) and ALL CAPS (upper case) logic circuit 125 by either depressing the CTRL key or depressing the ALL CAPS key of the keyboard 46. If the CTRL key is depressed, bits 6, 7 and 8 are forced to 001 in all codes in which bit 7 is output as a logic 1 level from the keyboard encoder 60. If the ALL CAPS key is depressed, bit 6 is forced to a logic 0 in all codes that represent letters of the alphabet, i.e. those codes in which bit 9 is a logic 0.

The keyboard input registers receive both the character code data and the character strobe pulse from the encoder 60, but not concurrently. The character strobe pulse is also received by an OR gate 126 and then is stored in a character strobe flip-flop circuit 127. The output of the flip-flop circuit 127 is connected to one input of an AND gate 128. The other input of the AND gate 128 receives a write keyboard gate signal, which comes from the system timing circuit 100 (FIG. 5) as a video field signal. The video field signal determines during any given field when the keyboard character code is written into the memory 50. The writing in the memory 50 occurs as part of the video refresh cycle once every video scan field.

When the write keyboard gate signal is present and the character strobe flip-flop circuit 127 is set, the AND gate 128 produces a select signal to cause the data input selector 124 to enter the keyboard character code data from the registers 61 and 62 into the read/write memory 50 and also to supply a write command to the memory 50. The write address is supplied from the address counter 99 (FIG. 4) to the memory circuit 50.

A character code writing may be repeated in the memory 50. This occurs when a key is depressed at least a predetermined time interval, unless the key by ts code is specifically excluded. When a key is depressed in this manner, a key down signal is produced by the encoder 60. The key down signal activates a timer 130. After a predetermined time interval has elapsed, a pulse is transmitted through an AND gate 131 when a bit 10 signal is present at the other input of the AND gate 131. The bit 10 signal is present when the code stored in the keyboard input registers 61 and 62 is a repeatable code. If it is, a true input is provided to the AND gate 128 through the OR gate 125 and the flip-flop circuit 127. The output of the character strobe flip-flop is in a set state. Thereupon, the succeeding write keyboard gate signal on the AND gate 128 causes the character code to be written into the memory 50. If an operator holds the key down in a depressed position, the write cycle will be repeated once every video scan field, provided the write keyboard gate signal is true.

The cathode ray tube 45 has a non-interlaced video raster which is scanned in a horizontal direction from left to right and in a vertical direction from top to bottom. Each frame consists of two fields, A and B, with 263 scan lines per field, of which 250 are visible. The remaining scan lines occur during vertical retrace time. The two fields are scanned on the cathode ray tube display 45 one after another in such a manner that the 250 visible scan lines in one field physically overlay those of the other field. The rate at which the fields are scanned is 60 per second, and they appear to an operator as a single display.

Each scan line is divided horizontally into 800 elements, each element representing one bit as it is read out of the video display segment of the read/write memory 50. There are 526 scan lines of 800 elements each, but data is written on a 500 × 800 matrix of picture elements, which constitutes the visible part of every frame. Since every other scan line is overlayed by its adjacent scan line, the matrix, as it appears to the operator, is 250 × 800 elements.

Each alphanumeric character generally occupies an area ten picture elements wide by ten picture elements high. On the area of 10 × 10 picture elements, or dots, any character may be displayed by producing individual dots from the cathode ray tube beam.

Figure 6:
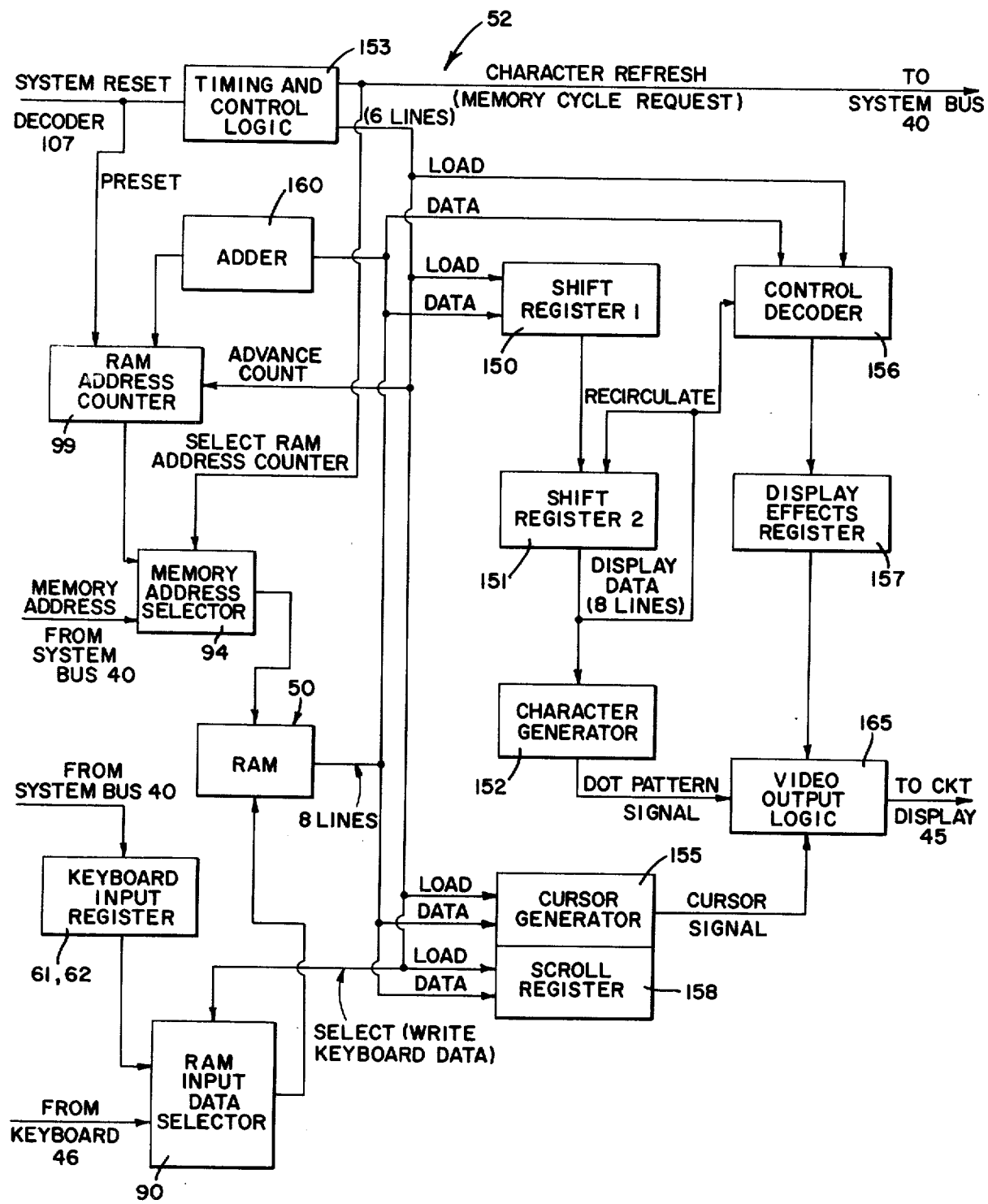
FIG. 6 is a block diagram of video circuits employed in the microcomputer system shown in FIG. 1.

Illustrated in FIG. 6 is a block diagram of the data output video circuits 52. The video circuits 52 read binary coded digital information out of the read/write memory 50 and generate therefrom video signals. The video signals along with horizontal and vertical blanking pulses are applied to the cathode ray tube display 45. In the cathode ray tube display 45, the video signals and blanking pulses are combined with horizontal and vertical drive signals, which are supplied from the system timing circuit 100 (FIG. 5) to drive the cathode ray beam. It is the horizontal and vertical drive signals and the horizontal and vertical blanking signals that control the video raster scan lines on the screen of the cathode ray tube display 45. It is the vertical drive decoder 103 that generates the vertical drive signals for physically overlaying adjacent scan lines for every other scan line on the screen of the cathode ray tube display 45 in a well-known manner.

There are two types of information that are read out of the memory 50. Once every ten scan lines on the screen of the cathode ray tube display 45, the video circuits 52 read 80 characters out of the memory 50, and prior to the beginning of every video scan field, the video circuits 52 read such information at the location of the cursor on the screen of the cathode ray tube display 45. The line of 80 characters stored in the memory 50 starts the video display on the screen of the cathode ray tube. The binary coded character data is converted into a video signal by the character generator 152 that represents the character dot pattern on the screen of the cathode ray tube display 45 and is combined with the cursor to produce a video signal as a TTL level video signal.

Toward this end, the video circuits 52 (FIG. 6) employ a series of registers 150 and 151, which store data output from the memory 50; a character generator 152 that generates the dot pattern for all characters displayed on the screen of the cathode ray tube display 45; and supporting circuits that generate various memory addressing, timing and access control signals.

At the beginning of every video field and during vertical retrace time, a system reset signal is supplied from the row count decoder 107 (FIG. 5) and the row counter 106 of the timing circuits 100 to a timing and control logic circuit 153 (FIG. 6). The system reset signal presets the address counter 99 in preparation for the start of a reading sequence at a specified memory address. Thereupon, a memory cycle request is generated by the timing and control logic circuit 153 and a read command is generated by timing and logic circuit 68 to begin the reading. The memory cycle request signal is applied to the memory address selector 94 for entering the memory address in the read/write memory 50.

Six registers of the read/write memory 50 are read out in sequence, with the read/write memory address counter 99 being advanced one counter every time a readout is completed, and a new memory cycle is again generated before each new readout. The first two registers of the memory 50 read are those containing the cursor row and column addresses. This data is entered into two registers of a cursor generator 155 and determines the row and character column at which the cursor is to appear on the screen of the cathode ray tube 45 during the succeeding screen field.

A write operation is now performed at another predetermined location in the memory 50, if a character input from the keyboard encoder 60 is available. The write operation has been heretofore described in detail.

After the write operation is completed at the other predetermined location in the memory 50, a register of the memory 50 at the next predetermined location is read. The next location is read from the register of the memory device 50 and the contents of the register are decoded by a control decoder 156 and stored in a display effects register 157. This data determines whether the display is started with an other-than-normal display effect on the screen of the cathode ray tube 45.

The page start row address is read out of a predetermined location in the memory 50 and entered into a scroll register 158. Additionally, the address of the location received by the control decoder 156 has been stored in an adder circuit 160 and is entered into the address counter 99. This completes the initial read/write memory 50 reading sequence and now all preconditions are established for the displaying of the next full video scan field on the screen of the cathode ray tube display 45. The address of the first row of 80 characters to be displayed is contained in the address counter 99 and the reading of display data begins with the next available memory cycle.

The reading of the first 80 characters is performed starting with the first available memory cycle after reading of the location in the memory 50 of the page start row address. The reading of the first 80 characters is completed during the vertical retrace period of the screen of the cathode ray tube display 45. The 80 characters are serially loaded into the shift register 150 and from the shift register 150 loaded into the shift register 151. When the vertical retrace on the screen of the cathode ray tube display 45 is completed and the scanning of the first video line on the screen of the cathode ray tube display 45 starts, each of the 80 characters is consecutively transferred from the shift register 151 into the character generator 152.

The output of the character generator 152 produces the first (topmost) scan line dot pattern signal for a video output logic circuit 165. At the video output logic circuit 165, the video signal, the cursor signal and the blanking circuit are combined for application on the cathode ray tube display 45. At the cathode ray tube display 45, the combined composite video signal produced by the video logic circuit 165 is combined with the vertical and horizontal drive signals for producing an image on the screen of the cathode ray tube display 45. This results in the cathode ray tube display 45 receiving the dot patterns for each of ten scan lines of a data character. In addition, the character stored in the shift register 151 are applied to the control decoder 156. Depending on whether the bits 7, 6 and 5 are 100 or not, the word is interpreted as a special display effects code. The character generator 152 does not respond to the display effects register 157 and the data from the display effects register 157 represents special display effects information for entry into the video output logic circuit 165 for application to the cathode ray tube display 45.

At the time the 80 characters are sequentially presented to the character generator 152, the characters are recirculated from the output of the shift registers 151 to the input of the shift registers 151. Therefore, at the completion of scan line 1 on the screen of the cathode ray tube display 45, the first scan line dot pattern for each of the 80 characters has been advanced by the character generator 152 to the video output logic circuit 165 and the shift register 151 has fully recirculated the 80 characters. Hence, the contents of the character data are the same as they were before the start of scan line 1.

With the start of scan line 2, the sequence of data to the character generator 152 and the recirculation of data in the shift register 151 are repeated. Now the character generator 152 produces the dot pattern for scan line 2 of all 80 characters. This sequence is repeated a total of 10 times, whereby the character generator 152 produces the dot pattern for all 10 scan lines for each character. While the dot patterns are generated and the data of the shift register 151 is being recirculated, the shift register 150 is being loaded with the next 80 characters for the second row of the display on the cathode ray tube 45. During scan line 10 of row 1, the recirculation of the data in shift register 152 is stopped and in lieu thereof the data from the shift register 150 is transferred into the shift register 151 in preparation for scan line 11. The scan line 11 marks the top of the second display row.

The sequence of recirculating the data of shift register 151, while reloading the shift register 150, and the transfer of data during scan line 10 takes place during every video display row on the sceen of the cathode ray tube. This takes place a total of 25 times. Allowing for interruptions by the microprocessor 41 and the read/write memory refresh cycle requests from the timing and control logic 153, the reloading of the shift register 150 takes place during the first 2.5 scan lines of the first display row on the screen of the cathode ray tube display 45. Therefore, during the last 7.5 scan lines of the first row, the shift register 150 is dormant and memory cycles are avilable to other devices.

The character generator 152 (FIG. 6) produces each vertical leg dot signal of a character dot pattern in a plurality of dots extending in the horizontal direction, which in the preferred embodiment is a pair of horizontally aligned dots for each vertical leg dot signal of a character dot pattern. A conventional and well-known character generator is used, employing known techniques for programming internally the character generator in producing the dot pattern signal.

Heretofore, the character font was formed in a stairstep manner employing vertically aligned single column of dots to form the vertical leg of a character. As a consequence thereof, the vertical legs of a character appeared dimmer on the screen of a cathode ray tube than the horizontal parts of a character. Stated otherwise, the horizontally aligned dots of a character appeared brighter on the screen of a cathode ray tube than the vertically aligned dots of a character.

According to the present invention, the character font is formed in a stairstep manner employing, however, a plurality of horizontally aligned dots for forming the vertical legs of the character font (FIG. 1). Therefore, each vertical leg includes a plurality of vertical columns of dots adjacent one another to extend the vertical leg in the horizontal direction.

In this manner, the character displayed on the screen of the cathode ray tube 45 appears as a clear, bold image without making the character appear coarse and without resorting to an expensive cathode ray tube display. The vertical legs now appear on the screen of the cathode ray tube with a brightness approximating the horizontal parts of the character. The character fineness is maintained because the stairstep formation of parts are the same as heretofore employed in forming a character font.

The output of the character generator 152 is entered into the video logic circuit 165, where it is combined with the cursor signal, mixed with horizontal and vertical blanking information, and applied to the cathode ray tube display 45 as a video signal to be displayed thereon.

For optionally reducing the intensity of the image of a character displayed on the cathode ray tube display 45, the area of each dot element forming the character displayed on the screen of the cathode ray tube 45 is reduced. For this purpose, the dot elements of the video dot pattern signal applied to the cathode ray tube display 45 by the video output circuit 165 are subjected to a chopping action. Stated otherwise, the video elements of the video dot pattern signal are reduced so that each dot appearing on the screen of the cathode ray tube display 45 is of a lesser area to provide an image in which the intensity of illumination of a character is less. The chopping of each video element of the video dot pattern signal into a half-element gives the visual effect of a dim character. Heretofore, dim characters were generated by reducing the amplitude of the video signal.

As previously described, character data are stored in the shift registers 150 and 151 from the memory 50 and are entered into the character generator 152 from the shift registers 151 from which is produced a video dot pattern signal. The video dot pattern signal is received by the video output circuit 165 in which it is combined with a cursor signal to form a composite video signal for application to the cathode ray tube display 45.

In the video output circuit 165 are a series of well-known AND gates, not shown. The control decoder 156 senses the character code stored in the shift registers 151. The character code is stored in the memory 50 by the microprocessor 41 for entry into the shift registers 150 and 151. When the control decoder 156 senses a predetermined combination code in the shift registers 151, it enables the AND gates in the video output circuit 165 to gate the video elements of the video dot pattern by applying to the gates of the video output circuit 165 a basic clock frequency pulse found in the video output circuit 165. The basic clock frequency pulses gate the rate at which video elements of the video dot pattern are subjected to the chopping action. This action is in the nature of a pulse width modulation of the video elements of the video dot pattern. Thus, the video elements are reduced from a full width to a half width.

Any of the input/output devices 35 or the microprocessor 41 can request a memory cycle, but the requests are ordered in priority. The microprocessor 41 has the highest priority, followed by the memory refresh system of the timing circuits 100, which is followed by video refresh including keyboard input of the video circuits 52, and lastly the input/output devices. Of the input/output devices, the cathode ray tube display 45 has priority.

The microcomputer terminal system 20 can be interconnected by means of the system bus 40 to a conventional host computer 200 (FIG. 1) or a telecommunications line 201, which can send data for processing and display on the cathode ray tube display 45, or receive data over the system bus 40. A variety of peripheral devices can be connected to the microcomputer system 20 to expand its data handling capabilities or store programs and data for a particular processing application. Typical peripheral devices are a conventional hard copy printer 202, or an auxiliary memory device 203, such as a disc, cassette, or reel-to-reel tape drive. These circuits can perform thier functions independently while interfacing with the microprocessor 41 or the memory 50 on a priority basis. The interface circuits are well-known circuits for entering data signals from the peripheral devices to a common form compatible to the memory 50 or the microprocessor 41.

Thus, the system bus 40 enables the microcomputer system 20 to add circuits to interface with bus 40 for peripheral and additional devices as above mentioned. The peripheral devices can read or write to the read/write memory 50 directly without the intervention of the microprocessor 41. Additionally, more than one microprocessor can use the system bus 40. Each microprocessor, such as the microprocessor 41, has its own read only memory and any part or all of the read/write memory 50 can be used in common by the microprocessors. Thus, various microprocessors can perform various functions and complement one another on the various functions.

The subordination of memory cycle requests is accomplished by a series of interconnections and decoding circuits on each of the various lines. The microprocessor 41 has top priority in having access to the memory 50. Therefore, the microprocessor bus request is sent out by way of pin A31 to all other circuits. The microprocessor 41 does not accept any other bus request signals, since it does not subordinate its bus request to others. The memory refresh has the next priority, and, therefore, its bus request signal is sent out over pin A39 to all circuits other than the microprocessor 41. The video refresh bus, which is third in priority, is sent out over the pin A40 to all circuits except the microprocessor 41. The keyboard character input function is performed as part of the video refresh cycle and the keyboard input circuits do not need to generate a separate bus request.

The peripheral device bus requests are subordinated by means of one line, which is connected to all sections serially, starting with pin A48 of a section and ending with pin A38 of another section. With this line, a priority is assigned to each circuit section. The bus request logic on each section is such that it subordinates its own function to the signal coming in on pin A38 from the previous section. In this manner, the proper subordination is acheived.

From the foregoing, it is to be observed that while the shift register 152 (FIG. 6) feeds character data to the cathode ray tube display 45, the shift register 151 receives the next set of character data from the memory 50. This loading of the shift register 151 does not have to be at the screen refresh rate, but may be at its convenience. Therefore, the shift registers 151 can delay loading to give priority to the microprocessor 41. Thus, the microprocessor 41 can obtain priority without interrupting the screen refresh cycle of the cathode ray tube display 45. Accordingly, the operation can proceed at a slow rate and allow plenty of time for the microprocessor 41 to use the memory 50. The memory 50 does not require a rapid read time, allowing greater latitude in the choice of its elements. Hence, a more economical memory for the read/write memory can be employed, and also the power requirements for the microcomputer terminal system 20 are reduced. In addition to the foregoing, the use of the system bus 40 is kept to a minimum for screen refresh because the memory 50 is read only once for each character rather than once for each scan line of each character. This action leaves additional time for the other devices to use the system bus 40.

In view of the fact that the microcomputer has its own memory 42 (FIG. 3), the microprocessor 41 can read data from the memory 42 without using the system bus 40. Therefore, it can read data from the memory 42 without interrupting other devices in the system 20. Thus, a plurality of operations can take place within the system 20 at a given time.

The cursor address registers are always loaded by the microprocessor 41 and are read by the video circuits 52 (FIG. 6). The first two registers of the memory 50 read out are those containing the cursor row and column addresses. This data is loaded into two registers in the cursor generator 155 (FIG. 6) and determines the row and character column of which the cursor is to appear on the screen of the cathode ray tube during the next character display field. The microprocessor 41 operation does not control the refresh operation or the recirculation of data through the shift register 152 (FIG. 6). Since the microprocessor 41 controls the cursor, it is always informed of the location of the cursor. This arrangement simplifies the programming of the microprocessor 41.

As shown in FIG. 6, the keyboard has direct access to the memory 50 through the input data selector 90. This is achieved without intervention from the microprocessor 41. The address counter 99 designates character location in the memory 50 whether or not the microprocessor 41 is present. The microprocessor 51 periodically reads the memory 50 at a predetermined location to find the character and will write the character at the cursor location in the memory 50. The microprocessor 41 finds the cursor location in the memory 50 to write the character data in the memory 50 at the cursor location. By loading all characters at cursor locations through the microprocessor 41, the operational characteristics of the system 20 become dependent on the programming of the microprocessor 41. This provides improved versatility for the system 20.

In FIG. 1 are shown interface circuits between the system bus 40 and the host computer 200 and between the system bus 40 and the auxiliary memory device 203, such as a disc memory. The interface circuits provide direct memory access in a well-known manner. The interface circuits will read or write data to the auxiliary memory device 203, such as a disc memory and the host computer 200, respectively. The direct memory access interface circuit are operated through the system bus 40 by the microprocessor 41. By instructions from the microprocessor 41, the direct memory access interface circuits read or write data on a noninterfering basis from the read/write memory 50 to the auxiliary memory device 203, such as a disc memory, or from the auxiliary memory device 203, such as a disc memory, to the read/write memory 50.

The direct memory access interface circuits under instructions from the microprocessor 41 perform a gather-write operation. More specifically, it will gather blocks of data from noncontiguous addresses of the read/write memory 50 and write this data in contiguous locations in the auxiliary memory device, such as a disc memory or in the host computer 200. In that manner, selected data from the read/write memory can be stored in the disc memory, such as the auxiliary memory device 203 or in the host computer 200.

Additionally, the direct memory access interface circuits under instructions from the microprocessor 41 perform a read-scatter operation. More specifically, data stored in the auxiliary memory device 203, such as a disc memory, or in the host computer 200, is read from contiguous disc locations and scattered to noncontiguous locations in the read/write memory 50.

To simulate forms on the screen of the cathode ray tube display 45, the cathode ray tube display 45 will produce thereon horizontal and vertical lines. Toward this end, a circuit with a read/write form memory will communicate with the system bus 40. The microprocessor 41 will enter into the form memory data to prescribe the location of each horizontal and vertical line segment to be displayed on the cathode ray tube display 45. Video circuits similar to those shown in FIG. 6, for example, generator 152 and video output circuit 165, will apply a video signal on the cathode ray tube display 45 for generating horizontal and vertical lines and mix therewith the composite video signal from the video output circuit 165 for display on the cathode ray tube display 45.

We claim:
1. An information terminal system comprising:
a. a memory storing character data;
b. data means for entering character data into said memory;
c. a first set of shift registers receiving character data from said memory for storage therein;
d. a second set of shift registers receiving character data from said first set of shift registers for storage therein;
e. video circuit means receiving character data from said second set of shift registers for producing video signals; and
f. means including a character display receiving said video signals from said video circuit means for displaying a character element.

2. An information terminal system as claimed in claim 1 wherein said first set of shift registers stores a row of character data and said second set of shift registers stores a row of character data, whereby said second set of shift registers advances character data to said video circuit means to display a character element in a first row on said character display while said first set of shift registers receives for storage therein character data for a second row, said character data for said second row to be shifted to said second set of shift registers and to be advanced therefrom to said video circuit means to display a character element in a second row on said character display.

3. An information terminal system as claimed in claim 2 and comprising means connected to said second set of shift registers for circulating the character data stored in said second set of shift registers back into said second set of shift registers until said first set of shift registers transfers the character data stored therein into said second set of shift registers.

4. An information terminal system comprising:
a. a memory for storing character data therein and for storing information as to the location of a cursor signal;
b. means for entering character data into said memory;
c. a microprocessor for entering a cursor signal into said memory;
d. video circuit means receiving a cursor signal and character data from said memory for producing video signals combined with a cursor location signal; and
e. means including a character display receiving said video signals from said video circuit means for displaying a character element at the cursor location.

5. An information terminal system as claimed in claim 4 wherein said memory stores a cursor signal representing a cursor row and a cursor column address, and wherein said video circuit means include a cursor generator responsive to said cursor signal in said memory for producing a cursor location signal for said video signal to locate the row and column of the cursor on said character display.

6. An information terminal system as claimed in claim 5 wherein the cursor signal is entered into said video circuit means prior to the entry of said character data, whereby the row and column location of a character element appears on said character display to begin the character display.

7. An information terminal as claimed in claim 6 wherein said means entering character data into said memory includes a keyboard and data input circuits.

8. An information terminal as claimed in claim 3 and further comprising a microprocessor for entering a cursor signal into said memory, said video circuit means receiving a cursor signal from said memory in addition to said video signals for producing video signals combined with a cursor location signal, said character display being operated for displaying the character element at the cursor location.

9. A computer terminal system comprising:
   a. a bus;
   b. a microprocessor communicating with said bus;
   c. a first memory connected to said microprocessor for reading by said microprocessor;
   d. a second memory communicating with said bus to be read by and written into by said microprocessor; and
   e. means including input/output devices for writing into and reading from said second memory.

10. A computer terminal system as claimed in claim 9 wherein one of said input/output devices is a keyboard.

11. A computer terminal system as claimed in claim 10 wherein another of said input/output devices is a character display.

12. A computer terminal system as claimed in claim 11 wherein said means including said keyboard enters character data into said second memory, wherein said microprocessor enters a cursor signal into said second memory, wherein said means includes video circuits receiving cursor signals and character data from said second memory for producing video signals combined with a cursor location signal, and wherein said character display receives said video signals from said video circuit for displaying a character element at the cursor location.

13. A computer terminal system as claimed in claim 12 wherein said second memory stores a cursor signal from said microprocessor representing a cursor row and a cursor column address, and wherein said video circuits include a cursor generator responsive to said cursor signal in said second memory for producing a cursor location signal for said video signal to locate the row and column of the cursor on said character display.

14. A computer terminal system as claimed in claim 13 wherein the cursor signal is entered into said video circuits prior to the entry of said character data whereby the row and column location of a character element appears on said character display to begin the character display.

15. A computer terminal system as claimed in claim 9 and comprising another microprocessor communicating with said bus, and a third memory read by said other microprocessor.

16. A computer terminal system as claimed in claim 9 and comprising a peripheral device communicating with said bus, said peripheral device being arranged through said bus for writing into and reading from said second memory.

17. A computer terminal as claimed in claim 16 wherein said peripheral device is a host computer.

18. A computer terminal as claimed in claim 16 wherein said peripheral device is an auxiliary memory device.

19. A computer terminal as claimed in claim 16 wherein said peripheral device is a printer.

20. A computer terminal as claimed in claim 16 wherein said peripheral device is a telecommunication line.

21. An information terminal as claimed in claim 3 and further comprising:

a. a microprocessor communicating with said memory; and
   b. a second memory read by said microprocessor.

22. An information terminal as claimed in claim 21 and comprising a bus through which said microprocessor communicates with said first mentioned memory.

23. A character display system comprising:
   a. storage means;
   b. means entering into said storage means signals representative of character data;
   c. a character generator responsive to said storage means for generating a video pattern signal representative of data stored in said storage means, said character generator producing a video pattern signal for a character to be displayed in which the portion of the video pattern signal representing a vertical leg of the character is formed from a plurality of columns aligned horizontally; and
   d. means including a character display receiving said video pattern signal and producing on said character display a character in which a vertical leg of the character is formed from a plurality of columns aligned horizontally.

24. A character display system as claimed in claim 23 wherein said character generator generates said video pattern signal for a character to be displayed on said character display in a stair-step formation for the legs and parts of the character.

25. A character display system as claimed in claim 24 in which said video pattern signal is a dot video pattern signal.

26. A character display system as claimed in claim 25 in which said character generator produces a dot video pattern signal for a character to be displayed on said character display in which the portion of the video pattern signal representing a vertical leg of the character is formed from a paiir of dot columns aligned horizontally, and the character displayed on said character display has a vertical leg formed from a pair of dot columns aligned horizontally.

27. A character display system comprising:
   a. storage means for storing a character code and character data;
   b. means entering into said storage means a character code and character data;
   c. a character generator responsive to the character data stored in said storage means for producing video elements to form a video pattern signal;
   d. a decoder for sensing the character code stored in said storage means;
   e. means including a video output circuit responsive to said storage means for producing a composite video signal, said video circuit being responsive to said decoder sensing a predetermined character code in said storage means for reducing in size the video elements of the video signal pattern in said composite video signal; and
   f. a character display responsive to said composite video signal with the video elements thereof reduced in size for displaying a character in which each of the visual elements thereof are reduced in area to decrease the intensity of the image of the character displayed thereon.

28. A character display system as claimed in claim 27 in which said video output circuit reduces the size of said video elements by a chopping action.

29. A character display system as claimed in claim 27 in which said video output circuit includes clock pulses and a series of gates, said decoder applying to said gates, said clock pulses in response to sensing said predetermined code stored in said storage means for gating to said character display a composite video signal in which the video elements thereof are gated at the frequency of said clock pulses for reducing in size the video elements of said composite video signal.

30. A character display system as claimed in claim 29 wherein each of said video elements in said video pattern signal is a dot pattern signal and wherein each of the visual elements displayed on said character display has the form of a dot, whereby the area of each dot visual element appearing on said character display is reduced for decreasing the intensity of the image of the character displayed on said character display.

31. A character display system as claimed in claim 29 in which said video elements of said video pattern signal are pulse width modulated by said clock pulses.

32. A computer terminal system comprising:
 a. a bus;
 b. a microprocessor communicating with said bus;
 c. a read/write memory communicating with said bus;
 d. means entering data at noncontiguous addresses in said read/write memory;
 e. a peripheral device having a disc memory; and
 f. a direct memory access interface circuit interconnecting said bus and said peripheral device, said interface circuit in response to signals from said microprocessor over said bus receives data from noncontiguous addresses of said read/write memory and enters said data at contiguous locations in said disc memory for storage therein.

33. A computer terminal as claimed in claim 32 wherein means enters data at contiguous addresses in said disc memory for storage therein and wherein said interface circuit in response to signals from said microprocessor over said bus receives data from contiguous addresses of said memory disc and enters such data from contiguous addresses of said memory disc into noncontiguous locations in said read/write memory.

34. A character display system comprising:
 a. first storage means;
 b. means entering into said first storage means signals representative of character data;
 c. second storage means;
 d. means entering into said second storage means signals representative of horizontal and vertical lines;
 e. a first character generator responsive to said first storage means for generating a video pattern signal representative of character data stored in said first storage means;
 f. a second character generator responsive to said second storage means for generating a video signal representative of horizontal and vertical lines; and
 g. means including a character display receiving said video pattern signal representative of character data and receiving said video signal representative of horizontal and vertical lines for producing on said character display a simulation of characters on a form.

35. An informational terminal system as claimed in claim 1 and comprising means for entering control code data into said memory, said first set of shift registers receiving control code data from said memory for storage therein, said second set of shift registers receiving control code data from said first set of shift registers for storage therein, said video circuit means receiving control code data from said second set of shift registers for producing video signals identifying the current operating mode, said means including said character display receiving said video signals for displaying a character element identifying the current operating mode for displaying the current operating code on said character display.

36. An informational terminal system as claimed in claim 35 wherein said character element is displayed within a predetermined area of said character display and said current operating mode is displayed on said character display outside of said predetermined area.

37. An information terminal system comprising:
 a. a memory for storing data;
 b. data means for entering character data into said memory;
 c. means for entering control code data into said memory;
 d. video circuit means receiving character data and control code data from said memory for producing video signals representative of character data and representative of the current operating mode; and
 e. means including a character display receiving said video signals from said video circuit means for displaying a character element and the current operating mode.

38. An information terminal system as claimed in claim 37 wherein said character element is displayed within a predetermined area of said character display and said current operating mode is displayed on said character display outside of said predetermined area.

* * * * *